United States Patent
Wang

(10) Patent No.: US 7,924,498 B2
(45) Date of Patent: Apr. 12, 2011

(54) SYSTEM AND METHOD FOR OPTICAL COMMUNICATION USING POLARIZATION FILTERING

(75) Inventor: Hongsheng Wang, Bound Brook, NJ (US)

(73) Assignee: Alphion Corporation, Princeton Junction, NJ (US)

( * ) Notice: Subject to any disclaimer, the term of this patent is extended or adjusted under 35 U.S.C. 154(b) by 222 days.

(21) Appl. No.: 12/043,496

(22) Filed: Mar. 6, 2008

(65) Prior Publication Data

US 2009/0059355 A1 Mar. 5, 2009

Related U.S. Application Data

(60) Provisional application No. 60/893,187, filed on Mar. 6, 2007.

(51) Int. Cl.
*H01S 5/00* (2006.01)
*G02F 1/35* (2006.01)
*G02F 3/00* (2006.01)
*H04B 10/12* (2006.01)

(52) U.S. Cl. .................. 359/334; 359/108; 359/326

(58) Field of Classification Search .................. 359/344, 359/326, 108

See application file for complete search history.

(56) References Cited

U.S. PATENT DOCUMENTS

| | | | | |
|---|---|---|---|---|
| 4,918,396 | A * | 4/1990 | Halemane et al. | 359/333 |
| 5,864,644 | A * | 1/1999 | DiGiovanni et al. | 385/43 |
| 6,208,454 | B1 * | 3/2001 | Koren et al. | 359/326 |
| 6,229,599 | B1 * | 5/2001 | Galtarossa | 356/73.1 |
| 6,532,091 | B1 * | 3/2003 | Miyazaki et al. | 398/175 |
| 6,751,002 | B2 * | 6/2004 | Ovadia et al. | 359/246 |
| 6,867,903 | B2 * | 3/2005 | Imajuku et al. | 359/330 |
| 6,992,813 | B1 * | 1/2006 | Tanaka et al. | 359/333 |
| 7,012,740 | B2 * | 3/2006 | Imajuku et al. | 359/330 |
| 7,023,611 | B2 * | 4/2006 | Huang et al. | 359/337 |
| 7,031,047 | B2 * | 4/2006 | Parolari et al. | 359/326 |
| 7,046,432 | B2 * | 5/2006 | Starodoumov | 359/341.32 |
| 7,107,795 | B2 * | 9/2006 | Cheo | 65/390 |
| 2001/0031110 | A1 * | 10/2001 | Imajuku et al. | 385/15 |
| 2004/0170438 | A1 * | 9/2004 | Kuribayashi | 398/175 |
| 2005/0078350 | A1 * | 4/2005 | Prucnal et al. | 359/333 |
| 2005/0078359 | A1 * | 4/2005 | Kim et al. | 359/344 |
| 2005/0238301 | A1 * | 10/2005 | Russell et al. | 385/113 |
| 2006/0010920 | A1 * | 1/2006 | Cheo | 65/390 |
| 2006/0187541 | A1 * | 8/2006 | Starodoumov | 359/341.32 |
| 2007/0008613 | A1 * | 1/2007 | Lakshminarayana et al. | 359/344 |

FOREIGN PATENT DOCUMENTS

JP 2001324734 A * 11/2001

* cited by examiner

*Primary Examiner* — Eric Bolda
(74) *Attorney, Agent, or Firm* — Kaplan Gilman & Pergament LLP

(57) ABSTRACT

An optical circuit is described which may include an SOA-MZI circuit providing an output signal; and a polarization filtering device (PFD) configured to receive the output signal of the SOA-MZI and to provide at least one signal at the output of the PFD.

4 Claims, 3 Drawing Sheets

SYSTEM AND METHOD FOR OPTICAL COMMUNICATION USING POLARIZATION FILTERING

CROSS-REFERENCE TO RELATED APPLICATIONS

This application claims the benefit of U.S. Provisional Patent Application Ser. No. 60/893,187, filed Mar. 6, 2007, entitled "SOA-MZI performance With Polarization Filtering Device", the entire disclosure of which is incorporated herein by reference.

BACKGROUND OF THE INVENTION

Semiconductor Optical Amplifier (SOA)-based Mach-Zehnder interferometers (SOA-MZI) are widely used in fiber-optic communication systems for photonic re-amplification, reshaping (P2R), retiming (P3R), Optical Time-Division Demultiplexing (OTDM), and optical logic gates.

However, low extinction ratios at the output of SOA-MZIs tend to diminish the effectiveness of these devices as communication components. Accordingly, there is a need in the art for an improved SOA-MZI communication circuit.

SUMMARY OF THE INVENTION

According to one embodiment, an optical circuit is disclosed, which may include an SOA-MZI circuit providing an output signal; and a polarization filtering device (PFD) configured to receive the output signal of the SOA-MZI and to provide at least one signal at the output of the PFD.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention.

Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

In this disclosure, we propose a method of using a polarization-filtering device (PFD) to improve the performance of an SOA-MZI, especially the optical extinction ratio thereof.

Figure 1:
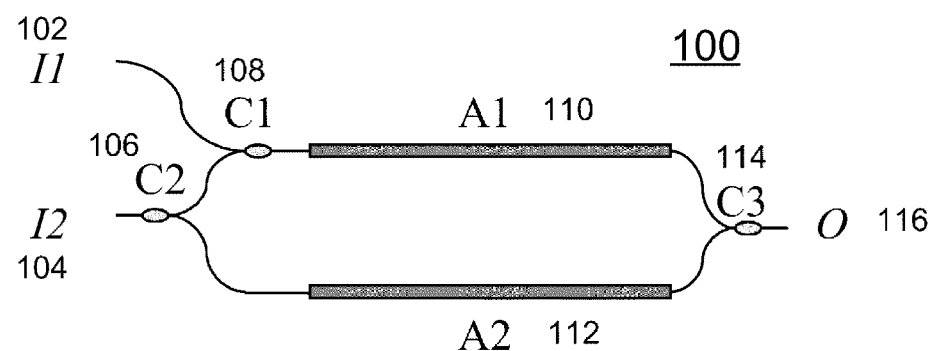
FIG. 1 is a schematic diagram of an SOA-MZI circuit.

An SOA-MZI circuit 100 is shown schematically in FIG. 1. Circuit 100 may include SOAs A1 110 and A2 112; couplers C1 108, C2 106, and C3 114. Inputs to circuit 100 may include input 1 "I1" 102 and input "I2" 104. Circuit 100 may produce output signal "O" 116.

An input signal of wavelength $\lambda 2$ from I2 is split into two paths at coupler C2 104, passing through SOA A1 110 and/or SOA A2 112, wherein signals along paths 110 and 112 may recombine at coupler C3 114. Another signal of wavelength $\lambda 1$, shown as I1 102, is directed through SOA A1, which induces an additional phase shift to the part of the I2 signal passing through SOA path A1 110, due to a phenomenon called cross-phase modulation.

The intensity of the output signal "O" 116 depends on this phase shift. When the phase shift is 0 degrees or an even multiple of 180 degrees, constructive interference between the two $\lambda 2$ signals occurs, resulting in a stronger signal. In contrast, when the phase shift (or, otherwise stated, "phase difference") between the two signals is an odd multiple of 180 degrees, destructive interference occurs, thereby leading to a combined signal having a magnitude close to 0 if the amplitudes of two $\lambda 2$ signals are equal.

In normal, non-inverting operation of the SOA-MZI (and in the absence of the I1 signal 102), the interferometer is set up so as to enable destructive interference between the signals proceeding through SOAs A1 110 and A2 112, by adjusting the magnitude of the injection current directed into SOAs A1 110 and A2, respectively. However, there are two orthogonal polarization states, namely TE polarization and TM polarization, in the SOAs, and the current settings at which the interferometer 100 reaches destructive interference are, in general, different for these two polarization states.

If the input signal from I2 is not perfectly aligned with either polarization state, the destructive interference of the combined state will have much higher power than a combined signal arising with either of the orthogonal states. Thus, when signal I1 102 is present, the SOA-MZI will have a lower extinction ratio due to the existence of higher zero-state power.

Figure 2:
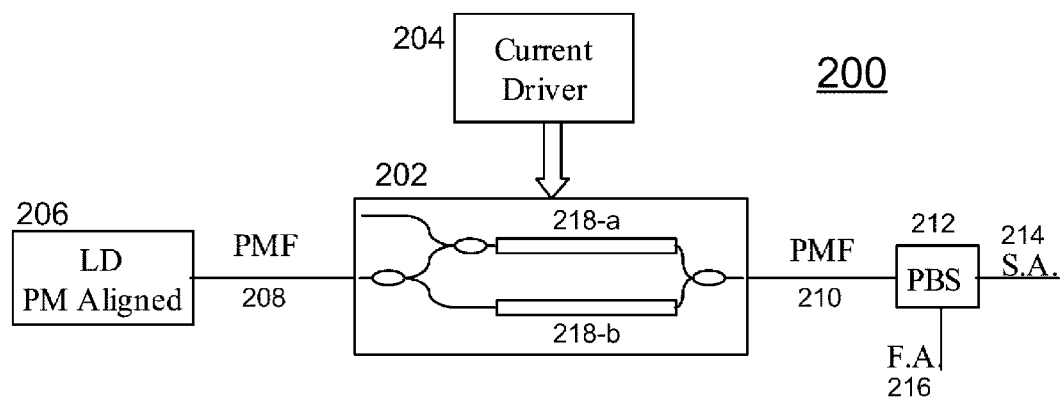
FIG. 2 is a block diagram of an optical circuit employing a polarization filtering device (pfd) in accordance with an embodiment of the invention.

To confirm that the two polarization states achieve destructive interference at different current settings, the circuit of FIG. 2 was used. Circuit 200 may include SOA-MZI circuit 202, current driver 204, polarization aligned laser diode 206, polarization maintaining fibers 208 and 210, polarization beam splitter (PBS) 212 having a slow axis output (S.A.) 214 and a fast axis output (F.A.) 216. Any other suitable polarization filtering device may be used in place of polarization beam splitter 212.

In this embodiment, a polarization-aligned laser diode (LD) 206 directs light into the slow axis of a polarization maintaining fiber (PMF) 208. The PMF 208 is preferably substantially aligned with the Transverse Electrical (TE) polarization of the SOA-MZI chip 202. SOA-MZI circuit 202 may generally correspond to the construction of SOA-MZI circuit 100 which was described previously.

An ILX current driver 204 (available from ILX Lightwave Corp.) preferably directs current into the two SOAs 218-a, 218-b of the SOA-MZI interferometer 202. Current is preferably fixed for one SOA and preferably varies for the other SOA. The output from the SOA-MZI 202 is preferably directed through PMF 210, shown at the right of SOA-MZI 202. PMF 210, as with PMF 208 discussed above, is preferably at least approximately aligned with the TE polarization of the SOA-MZI 202.

First, the output power may be measured at PMF 210. Then, a polarization beam splitter (PBS) 212 may be attached to the output of PMF 210. The signals at the slow axis output (S.A.) 214 and fast axis output (F.A.) 216 of the PBS 212 may then be measured separately.

Figure 3:
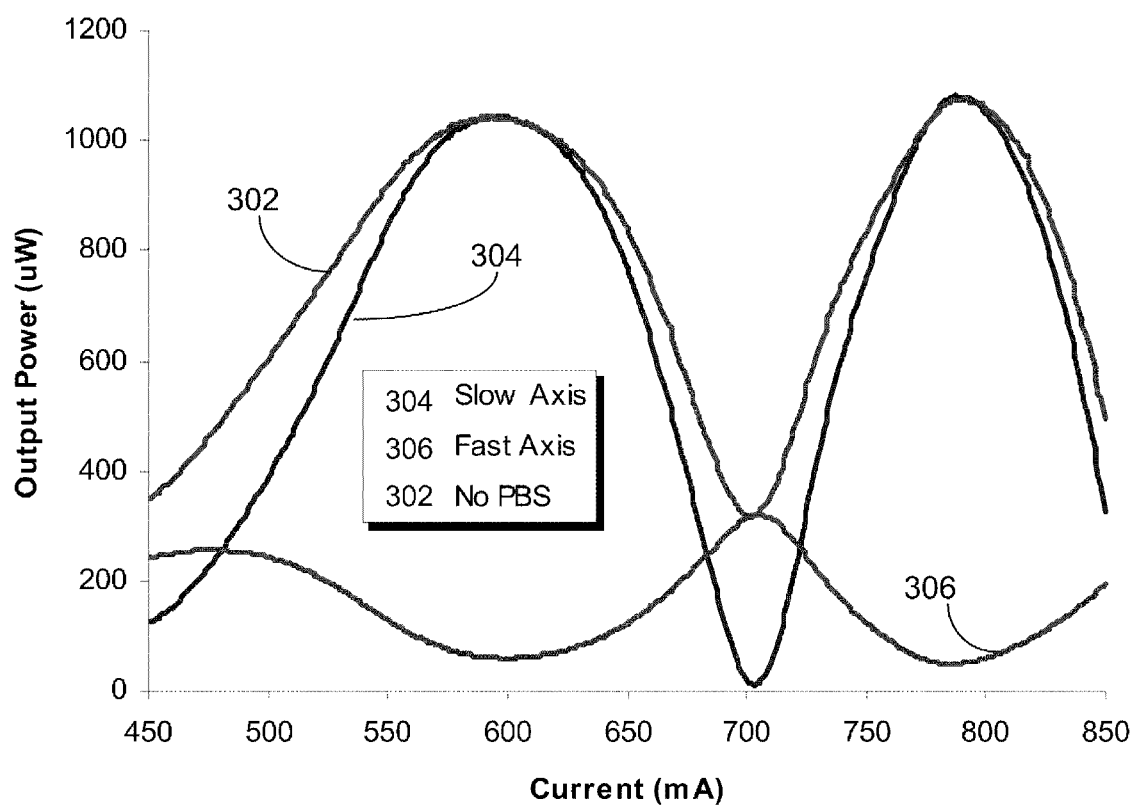
FIG. 3 is a graph of output power plotted against current for the output from the circuit of FIG. 2, in accordance with an embodiment of the invention.

FIG. 3 is a graph showing three signal outputs from circuit 200, which are slow axis plot 304 for slow axis signal 214, fast axis plot 306 for fast axis signal 216, and "no PBS" plot 302 for the signal emerging from circuit 200 when PBS 212 is not present in circuit 200.

As shown in FIG. 3, the slow axis plot 304 and the fast axis plot 306 are almost out of phase, while the slow axis output 304 has approximately four times more power than the fast axis output 306. It is noted that the peak-to-valley ratio is 89 for the slow axis output 304 and 6.5 for the fast axis output 306. As a result of the phase difference, the output measured at PMF 210 prior to operation on the output signal by PBS 212 only has a peak-to-valley ratio of 3.4.

Normally, the output of an SOA-MZI is taken directly without any polarization-filtering device (PFD), such as PBS 212 of FIG. 2. Due to the difficulty of aligning the input PMF to either the TE polarization or the TM polarization of the SOA-MZI 202, the output signal typically experiences a low extinction ratio. In this embodiment, a PFD is placed at the output of an SOA-MZI to improve the SOA-MZI's extinction ratio and to thus also improve the BER (bit error rate) performance of the SOA-MZI 202.

A polarization filtering device may be any device that is capable of allowing a signal of a selected polarization, or polarization range, to pass therethrough while blocking signals having other polarizations. Devices which may serve as a PFD include but are not limited to: a PBS (such as PBS 212), a single polarization fiber (SPF), a polarizer, or even a single-polarization amplifier. Upon deploying any of the above types of PFDs in the location of PBS 212 of FIG. 2, the output extinction ratio of circuit 200 is no longer limited by the PMF angular alignment tolerance and will thus improve.

Figure 4A:
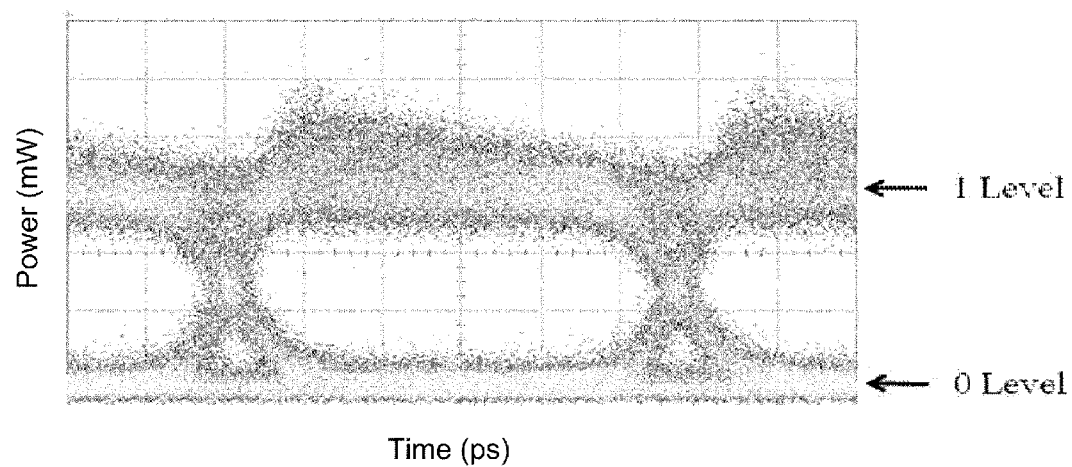
FIG. 4A is a screen shot of a signal measurement at the output of the device of FIG. 2 without the presence of a PFD.
Figure 4B:
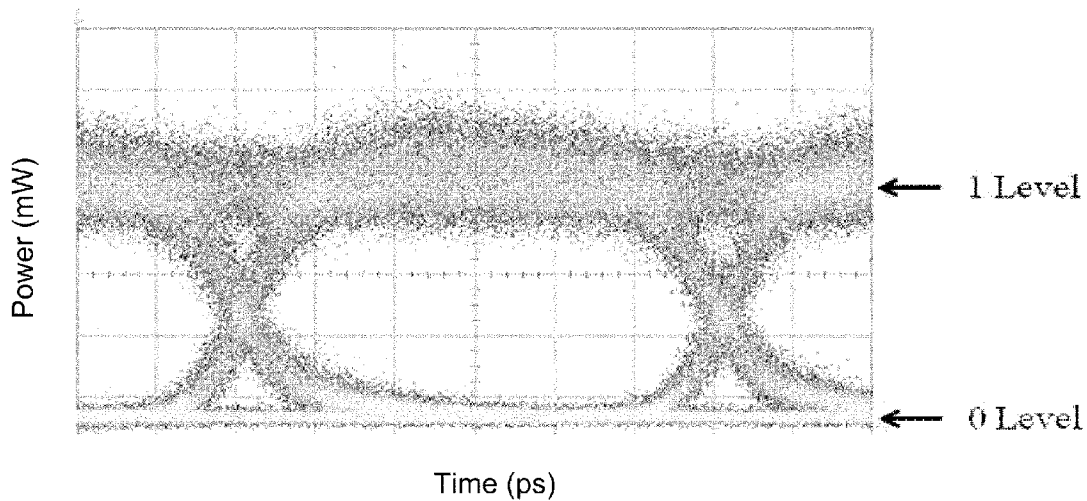
FIG. 4B is a screen shot of a signal measurement at the output of the circuit of FIG. 2 after adding a PFD.

FIGS. 4A and 4B demonstrate the available improvement. FIG. 4A shows logic 1 signal levels and logic 0 signal levels at the output of circuit 200 without a PFD deployed at the output thereof. The vertical scale in FIG. 4A is 0.5 mW (milliwatts) per division; and the horizontal scale is 34.7 ps (picoseconds) per division. In the graph of FIG. 4A, the level 1 power is 2.06 mW, and the 0 level power is 0.35 mW, leading to an output extinction ratio of 7.6 dB.

FIG. 4B shows logic 1 signal levels and logic 0 signal levels at the output of circuit 200 with a PFD (such as but not limited to PBS 212) deployed at the output thereof. The vertical scale in FIG. 4B is 0.246 mW per division; and the horizontal scale is 32.5 ps (picoseconds) per division. In the graph of FIG. 4B, the level 1 power is 0.96 mW, and the 0 level power is 0.042 mW, leading to an output extinction ratio of 13.6 dB.

Thus, when using a PFD, such as, but not limited to a polarizer, aligned with the slow axis of the PMF 210, the extinction ratio is improved from 7.6 dB to 13.6 dB.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An optical communication circuit, comprising:
   an SOA-MZI circuit providing an output signal having a fast axis component and a slow axis component;
   a first polarization maintaining fiber (PMF) coupled to an output port of the SOA-MZI circuit and configured to receive the SOA-MZI output signal;
   a polarization filtering device (PFD) configured to receive the SOA-MZI output signal from the first PMF and to output at signal corresponding to the slow-axis component of the SOA-MZI output signal, thereby providing a higher extinction ratio than that of the SOA-MZI output signal.

2. The optical circuit of claim 1 wherein the higher extinction ratio of the output from the PFD incurs a lower Bit Error Rate (BER) than that provided by the SOA-MZI.

3. The optical circuit of claim 1 wherein the PFD is a Polarization Beam Splitter (PBS) operable to separate a fast-axis component of the SOA-MZI output signal and the slow-axis component of the SOA-MZI output signal into (a) a fast-axis output signal from the PBS; and (b) a slow-axis output signal from the PBS, respectively.

4. The optical circuit of claim 1 further comprising:
   a second PMF coupled to the input to the SOA-MZI, such that the PMF is aligned with the Transverse Electrical (TE) polarization of the SOA-MZI circuit; and
   a polarization-aligned laser diode operable to direct light into a slow axis of the second PMF.

* * * * *